United States Patent [19]

Wamprecht et al.

[11] Patent Number: 5,319,056
[45] Date of Patent: Jun. 7, 1994

[54] POLYESTER POLYOLS AND THEIR USE IN TWO-COMPONENT POLYURETHANE LACQUERS

[75] Inventors: Christian Wamprecht, Neuss, Fed. Rep. of Germany; Wolfgang Henning, Amagasaki, Japan; Joachim Petzoldt, Langenfeld; Jürgen Meixner, Krefeld, both of Fed. Rep. of Germany

[73] Assignee: Bayer Aktiengesellschaft, Leverkusen, Fed. Rep. of Germany

[21] Appl. No.: 64,614

[22] Filed: May 19, 1993

[30] Foreign Application Priority Data

May 26, 1992 [DE] Fed. Rep. of Germany ....... 4217363

[51] Int. Cl.$^5$ .............................................. C08G 18/32
[52] U.S. Cl. ........................................ 528/49; 528/81; 528/303; 560/193; 428/423.1; 428/425.8
[58] Field of Search ................. 528/49, 81, 303; 560/193; 428/423.1, 425.8

[56] References Cited

U.S. PATENT DOCUMENTS 4,656,243 4/1987 Pedain et al. .................. 528/302
4,692,384 9/1987 Pedain et al. .................. 428/423.3
4,894,430 1/1990 Höhlein et al. .................. 528/75

*Primary Examiner*—Maurice J. Welsh
*Attorney, Agent, or Firm*—Joseph C. Gil; Thomas W. Roy

[57] ABSTRACT

The present invention relates to polyester polyols which have a hydroxyl number of 80 to 250 and are the reaction product of a) 52 to 60 mole % of a polyol component containing
  i) 10 to 50 mole % of one or more dihydric aliphatic alcohols having at least two carbon atoms, other than neopentyl glycol,
  ii) 5 to 40 mole % of one or more trihydric or higher functional aliphatic alcohols having at least 3 carbon atoms,
  iii) 10 to 40 mole % of one or more cycloaliphatic diols and
  iv) 10 to 60 mole % of neopentyl glycol, with
b) 40 to 48 mole % of a dicarboxylic acid component containing
  v) 0 to 49.9 mole % of one or more saturated aliphatic dicarboxylic acids or an anhydrides thereof having at least 2 carbon atoms and
  vi) 50.1 to 100 mole % of one or more unsaturated aliphatic dicarboxylic acids or anhydrides thereof having at least 4 carbon atoms, wherein the percentages of a) and b), i) to iv) and v to vi) add up to 100.

The present invention also relates to two-component polyurethane coating compositions containing a polyisocyanate component and a polyhydroxyl component, wherein at least a portion of the polyol component contains the polyester polyols according to the invention and to their use for the production of coatings on plastic moldings.

11 Claims, No Drawings

POLYESTER POLYOLS AND THEIR USE IN TWO-COMPONENT POLYURETHANE LACQUERS

BACKGROUND OF THE INVENTION

1. Field of the Invention

The present invention relates to polyester polyols and their use, in combination with modified polyisocyanates, as the binder in two-component polyurethane coating compositions for plastic moldings which provide excellent resistance to yellowing and tar stains.

2. Description of the Prior Art

It is known to coat substrates of low flexibility, e.g., metal or wood, with two-component polyurethane coating compositions based on polyesters, polyethers or polyacrylates containing hydroxyl groups, and organic polyisocyanates. The resulting coatings are distinguished in particular by excellent hardness, very good adhesion and high weather resistance. The chemical components of these lacquers and coatings are described inter alia in "Lackkunstharze" ("Synthetic Resins for Lacquers"). Hans Wagner/Hans Friedrich Sarx, Carl Hanser Verlag, Munich, pages 153 to 173, 1971.

However, these known two-component polyurethane coating compositions often result in highly crosslinked coatings whose elasticity and tendency to yellow, especially on irradiation with short-wave UV light, frequently do not satisfy the corresponding requirements of coatings for flexible substrates.

Flexible plastic parts are being used to an increasing extent for improving safety, especially in automobile construction. Thus, in some countries motor vehicles have to be equipped with bumpers which can withstand a collision at a particular speed (e.g., 5 mph) against a solid barrier without being damaged, while at the same time functional parts, such as headlamps, direction indicators, doors and bonnets, must not have their function impaired. In many countries, these and other even more extensive demands have led to the replacement of metal bumpers on automobiles with complete front and rear parts made of highly flexible materials which satisfy the demands on the ability of the bumper to recover without damage after such low impact collisions.

Highly flexible plastics which have proved suitable for this application include semirigid elastomeric polyurethanes (e.g., the Bayflex systems from Bayer AG, Leverkusen), which are manufactured from two-component polyurethane forming mixtures by the reaction injection moulding technique in closed molds, optionally with foaming; thermoplastic polyurethanes (e.g. the Desmophan elastomers from Bayer AG or the Texin elastomers from Miles Inc.) processed by the injection molding; and various grades of rubber.

Plastic parts based on these chemical materials, which have been used in vehicle construction for some years, are relatively large and therefore have a substantial affect on the appearance of the vehicle, which is why it is necessary to coat these parts. In addition, the surfaces of the plastics are degraded upon exposure to the weather and therefore have to be protected from the effects of the weather.

Flexible coatings are also required for less flexible plastic parts in order to protect the parts from mechanical damage. Thus, rigid but tough thermoplastics have to be coated with highly flexible, extremely resistant coatings in order to prevent the lacquer film from cracking due to mechanical damage or other external influences, and to prevent the cracks from propagating into the compact plastic.

It is possible using the known two-component compositions, to prepare highly flexible coatings which are totally adequate with respect to elasticity and low-temperature flexibility. This is made possible especially by using, as the essential polyol component, particular polyhydroxy polyesters which are synthesized predominantly from aliphatic diols and at most have a hydroxyl functionality slightly greater than 2. However, the disadvantage of two-component polyurethane coating compositions based on these polyester diols and the known lacquer polyisocyanates is the fact that the coatings have inadequate weather resistance and chalk resistance, such that the gloss retention of the coatings built up from such coating compositions is totally unsatisfactory. The susceptibility of these coating systems to yellowing on irradiation with short-wave UV light is particularly disadvantageous. Another serious disadvantage is the lack of resistance of the coatings to tar stains. This is especially true with regard to the systems of DE-OS 3,421,122, which otherwise substantially meet the requirements of flexible plastic coatings.

A significant improvement in the susceptibility of highly flexible polyurethane coating compositions to yellowing on irradiation with short-wave UV light can be achieved with the polyesterpolyols described in EPA 0,318,800. Furthermore, these polyester polyols also afford improvements in the resistance of corresponding polyurethane coating compositions to tar stains, although these improvements are inadequate in terms of current requirements.

An object of the present invention is to provide a two-component polyurethane coating composition which satisfies these special requirements and is especially suitable for coating flexible plastic parts. In particular, the coating composition should satisfy all of the following requirements:

1. Non-yellowing coatings upon exposure to shortwave UV light:
   The coating must resist irradiation from shortwave UV light (wavelength <400 nm) over a period of at least 200 h without yellowing.
2. Low-temperature elasticity:
   Even at −20° C., the film must not crack during low impact collisions and the mechanical properties of the plastic should be impaired as little as possible by the coating.
3. Resistance to tar stains:
   The coating must be able to resist the action of a special tar-containing test solution.
4. Good gloss retention:
   The coating on the plastic parts should be as durable as possible, i.e., under the effects of the weather, it must not degrade more rapidly than the coatings on metal parts.
5. No post-embrittlement on exposure to the weather:
   Even after prolonged exposure to the weather, the film must not suffer from post-embrittlement and the low temperature elasticity should not deteriorate during exposure to the weather.
6. Low drying temperature:
   Because the heat deflection temperature of such large plastic parts is limited, the requisite drying temperatures and times of the coating compositions should therefore be minimized for this reason and also for energy saving reasons.

7. Repairability:

The drying conditions of the coating composition should not only be sufficient for initial application, but also for repair coating at 80° C. or room temperature.

It has now been surprisingly found that these objectives may be achieved, in particular the resistance of the coatings to tar stains, by using the polyester polyols according to the invention as the polyhydroxyl component or a substantial portion of the polyhydroxyl component in two-component polyurethane coating compositions.

SUMMARY OF THE INVENTION

The present invention relates to polyester polyols which have a hydroxyl number of 80 to 250 and are the reaction product of a) 52 to 60 mole % of a polyol component containing
   i) 10 to 50 mole % of one or more dihydric aliphatic alcohols having at least two carbon atoms, other than neopentyl glycol,
   ii) 5 to 40 mole % of one or more trihydric or higher functional aliphatic alcohols having at least 3 carbon atoms,
   iii) 10 to 40 mole % of one or more cycloaliphatic diols and
   iv) 10 to 60 mole % of neopentyl glycol, with
b) 40 to 48 mole % of a dicarboxylic acid component containing
   v) 0 to 49.9 mole % of one or more saturated aliphatic dicarboxylic acids or anhydrides thereof having at least 2 carbon atoms and
   vi) 50.1 to 100 mole % of one or more unsaturated aliphatic dicarboxylic acids or anhydrides thereof having at least 4 carbon atoms, wherein the percentages of a) and b), i) to iv) and v to vi) add up to 100.

The present invention also relates to two-component polyurethane coating compositions containing a polyisocyanate component and a polyhydroxyl component, wherein at least a portion of the polyol component contains the polyester polyols according to the invention and to their use for the production of coatings on plastic moldings.

DETAILED DESCRIPTION OF THE INVENTION

Similar but not identical polyester polyols to those according to the invention are described in German patent Application P 4,100,204.0 (U.S. Ser. No. 07/811,342) and used as a polyol component in thermosetting one-component coating compositions.

The particularly good suitability of the polyester polyols for the use according to the invention is attributable to the selection and amounts of the starting materials for preparing the polyester polyols. The polyester polyols according to the invention have hydroxyl numbers of 80 to 250, preferably 120 to 200; acid numbers of less than 12, preferably 0.5 to 10; and an average molecular weight, which may be calculated from the stoichiometry of the starting materials used, of 800 to 10,000, preferably 800 to 5000. The polyester polyols according to the invention are highly viscous, colorless, clear resins which dissolve to give clear solutions in lacquer solvents, e.g., hydrocarbons such as toluene, xylene and higher alkylbenzenes; esters such as ethyl acetate, butyl acetate, methyl glycol acetate, ethyl glycol acetate and methoxypropyl acetate; ketones such as methyl ethyl ketone and methyl isobutyl ketone; and mixtures thereof.

Another essential feature of the invention is that the polyester polyols according to the invention are prepared from components a) and b).

Polyol component a) is composed of individual constituents i) to iv). Component i) is selected from dihydric aliphatic alcohols having at least 2, preferably 2 to 6 carbon atoms, with the exception of neopentyl glycol. Examples include ethylene glycol, propane-1,2- and -1,3- diol, butane-1,2- and -1,4-diol, pentane-1,5-diol, preferably hexane-1,6-diol. Mixtures of these diols can also be used as component i). Component i) is used in an amount of 10 to 50 mole %, preferably 15 to 45 mole %, based on the total moles of component a).

Component ii) is selected from trihydric or higher functional aliphatic alcohols having at least 3, preferably 3 to 6 carbon atoms. Examples include trimethylolpropane, glycerol and/or pentaerythritol. Component ii) is used in an amount of 5 to 40 mole %, preferably 10 to 35 mole %, based on the total moles of component a).

Component iii) is selected from cycloaliphatic diols such as cyclohexane-1,2-, -1,3- and -1,4-diol, 2,2-bis-(4-hydroxycyclohexyl)-propane, bis-(hydroxymethyl)-hexahydrotricyclodecane and 1,2-, 1,3- and especially 1,4-bis-(hydroxymethyl)cyclohexane. Component iii) is used in an amount of 10 to 40 mole %, preferably 15 to 35 mole %, based on the total moles of component a).

Component iv) is neopentyl glycol (2,2-dimethylpropane-1,3-diol). Component iv) is used in an amount of 10 to 60 mole %, preferably 15 to 55 mole %, based on the total moles of component a).

The dicarboxylic acid component b) is a mixture of the individual components v) and vi). The mixture contains 0 to 49.9, preferably 5 to 40 and particularly preferably 10 to 30 mole % of component v) and 50.1 to 100, preferably 60 to 95 and particularly preferably 70 to 90 mole % of component vi), based on the total amount of component b).

Component v) is selected from saturated aliphatic dicarboxylic acids having at least 2, preferably 4 to 6 carbon atoms, such as oxalic acid, succinic acid, glutaric acid and especially adipic acid. Mixtures of these acids can also be used. It is also possible, although not generally done, to use the intramolecular anhydrides of these acids.

Component vi) is selected from unsaturated aliphatic dicarboxylic acids or anhydrides thereof having at least 4, preferably 4 to 5 carbon atoms, such as fumaric acid, maleic acid, itaconic acid or the anhydrides of these acids. It is preferred to use maleic anhydride as component vi). Any desired mixtures of these acids or acid anhydrides can also be used as component vi).

The percentages of components a) and b) add up to 100 in each case.

To prepare the polyester polyols, 52 to 60, preferably 52 to 58 mole % of component a) and 40 to 48, preferably 42 to 48 mole % of component b) are used. These percentages preferably add up to 100.

The polyesters according to the invention are prepared in known manner by methods such as those described in detail, for example, in "Ullmanns Encyclopadie der technischen Chemie" ("Ullmann's Encyclopaedia of Chemical Technology"), Verlag Chemie Weinheim, 4th edition (1980), Volume 19, pages 61 et seq.; and by H. Wagner and H. F. Sarx in "Lackkunstharze" ("Synthetic Resins for Lacquers") Carl Hanser verlag, Munich (1971), pages 86 to 152. The esterification is optionally carried out in the presence of a catalytic amount of a conventional esterification catalyst, e.g., acids, bases or transition metal compounds such as titanium tetrabutylate, at approx. 80° to 260° C., preferably 100° to 230° C. The esterification reaction is carried out until the hydroxyl and acid numbers reach the desired values.

In the two-component compositions according to the invention the polyester polyols are optionally used in admixture with other known organic polyhydroxyl compounds as a polyhydroxyl component. These other polyhydroxyl compounds include polyester, polyether or polyacrylate polyols. If further organic polyhydroxyl compounds are used in combination with the polyester polyols according to the invention, it is preferable to use the known polyacrylate polyols.

Suitable polyacrylate polyols for this purpose include copolymers of hydroxyalky, (meth)acrylates as obtained by reacting (meth)acrylic acid with ethylene oxide or propylene oxide with other olefinically unsaturated monomers such butyl acrylate, methyl methacrylate, styrene, acrylic acid, acrylonitrile and methacrylonitrile. The copolymers should be soluble in the previously described lacquer solvents. The hydroxyl group content of the polyacrylate polyols is preferably between 1 to 5% by weight.

The polyester polyols according to the invention can be used in admixture with up to 90, preferably up to 50 hydroxyl equivalent %, based on the polyhydroxyl component, of other these other polyols. It is preferred, however, to only use the polyester polyols according to the invention as the polyol component in the two-component polyurethane coating compositions.

The polyisocyanate component for the two-component polyurethane coating compositions according to the invention are selected from known "lacquer polyisocyanates," i.e., modified polyisocyanates having urethane groups or preferably biuret groups or isocyanurate groups and prepared from monomeric diisocyanates such as 1,6-diisocyanatohexane, 1-isocyanato-3,3,5-trimethyl-5-isocyanatomethylcyclohexane (isophorone diisocyanate), 2,4-diisocyanatotoluene (and mixtures thereof with up to 35% by weight, based on the total mixture, of 2,6-diisocyanatotoluene) and mixtures of these modified polyisocyanates. The preferred "lacquer polyisocyanates" have aliphatically and/or cycloaliphatically bound isocyanate groups.

The "lacquer polyisocyanates" having urethane groups include especially the reaction products of 2,4- and optionally 2,6-diisocyanatotoluene with less than stoichiometric amounts of trimethylolpropane or mixtures thereof with simple diols such as the isomeric propane or butane diols. The preparation of these lacquer polyisocyanates having urethane groups in essentially monomer-free form is described, for example, in DE-PS 1,090,196.

The preferred lacquer polyisocyanates having biuret groups include especially those based on 1,6-diisocyanatohexane. Their preparation is described, for example, in EP-B1-0,003,505, DE-PS 1,101,394, U.S. Pat. No. 3,358,010 or U.S. Pat. No. 3,903,127.

The lacquer polyisocyanates having isocyanurate groups which are also preferred include especially the trimers or mixed trimers of the previously described diisocyanates. Examples include the polyisocyanates based on diisocyanatotoluene and having isocyanurate groups described in GB-PS 1,060,430, GB-PS 1,506,373 or GB-PS 1,485,564; the mixed trimers of diisocyanatotoluene with 1,6-diisocyanatohexane which may be obtained, for example, according to DE-PS 1,644,809 or DE-OS 3,144,672; and especially the aliphatic or aliphatic-cycloaliphatic trimers or mixed trimers based on 1,6-diisocyanatohexane and/or isophorone diisocyanate which are lo obtained, for example, according to U.S. Pat. No. 4,324,879, U.S. Pat. No. 4,288,586, DE-OS 3,100,262, DE-OS 3,100,263, DE-OS 3,033,860 or DE-OS 3,144,672. The modified polyisocyanates according to the invention preferably have an isocyanate content of 5 to 25% by weight and a residual content of monomeric diisocyanates, used for their preparation, of less than 2% by weight. It is also possible to use any desired mixtures of the previously described modified polyisocyanates.

In the two-component polyurethane coating compositions according to the invention, the polyol component and the polyisocyanate component are present in amounts corresponding to an equivalent ratio of isocyanate groups to hydroxyl groups of 5:1 to 1:2, preferably 1.5:1 to 1:1.2. The two-component binders obtained by mixing the two components have only a limited processing time of approx. 2 to 48 hours and may be processed either as solvent-free clear lacquers or, preferably, in admixture with conventional auxiliaries and additives. These auxiliaries and additives may be added to either the mixture or to the individual components before they are thoroughly mixed.

Examples of suitable auxiliaries and additives include solvents such as ethyl acetate, butyl acetate, methyl ethyl ketone, methyl isobutyl ketone, ethylene glycol monoethyl ether acetate, methoxypropyl acetate, toluene, xylene, white spirits and mixtures thereof. The solvents are used in an amount of up to 70, preferably up to 40% by weight, based on the weight of the total mixture.

Examples of other auxiliaries and additives include plasticizers (such as tricresyl phosphate or phthalic acid diesters), chloroparaffins, pigments and fillers (such as titanium dioxide, barium sulphate, chalk or carbon black), catalysts (such as N,N-dimethylbenzylamine, N-methylmorpholine, zinc octoate, tin(II) octoate or dibutyltin dilaurate), levelling agents, thickeners, stabilizers (such as substituted phenols), organofunctional silanes as adhesive primers, light stabilizers and UV absorbers. Examples of these light stabilizers include sterically hindered amines such as those described in DE-OS 3,993,655 (which corresponds to U.S. Pat. No. 4,123,418 and U.S. Pat. No. 4,110,304) and DE-OS 2,456,864 (which corresponds to U.S. Pat. No. 3,993,655 and U.S. Pat. No. 4,221,701). Particularly preferred compounds include bis(-1,2,2,6,6-pentamethylpiperidin-4-yl) sebacate, bis-(2,2,6,6-tetramethylpiperidin-4-yl) sebacate and bis-(1,2,2,6,6-pentamethylpiperidin-4-yl) n-butyl(3,5-ditert-butyl-4-hydroxybenzyl)malonate.

The moisture adhering to the fillers and pigments may be removed by prior drying or by the use of water-absorbing substances such as molecular sieve zeolites.

The two-component coating compositions may be cured at room temperature and does not require a temperature increase in order to achieve optimum properties. However, because drying at room temperature proceeds relatively slowly, it is often recommended to raise the temperature to approx. 60° to 120° C., preferably 80° to 100° C. for a period of 20 to 40 minutes. Although a higher drying temperature and thus a shorter baking process is possible, it carries the risk of deforming the plastic parts coated with the lacquers.

The two-component coating compositions according to the invention are suitable in particular for coating plastics, but may be used for coating metals and other substrates. Preferably, the coating compositions are used for coating flexible plastic parts such as those used in car construction.

Because the two-component coating compositions according to the invention may be applied to plastics and metals, they are especially suitable for coating the external parts of cars, which are manufactured from plastic and metal parts by the modern mixed method of construction. The special advantages of these coating compositions favor the on-line coating of external car parts because the coatings can cure even at low temperatures which saves the plastics from being exposed to excessive temperatures. The resulting coatings have excellent weather resistance and elasticity, so that the decorative coatings remain unchanged for a long period of time and withstand stresses due to collision or impact without being damaged. The coatings applied as automotive coatings also possess excellent resistance to stone chips.

However, the most important and, compared with known coatings, the most decisive improvement of the coatings according to the invention is their outstanding resistance to tar stains which, as is clearly shown in the Comparative Examples, is due to the components used to prepare the polyester polyol.

Furthermore, the coatings obtained from the two-component coating compositions optimally satisfy two mutually conflicting demands, i.e., an excellent low-temperature elasticity coupled with high gloss retention and resistance to yellowing upon irradiation with light of short wavelength, e.g., short-wave UV light.

The two-component coating compositions may be applied to the substrates to be coated by any of the methods conventionally used in coatings technology, such as by brushing, spraying or dipping. The coating compositions are suitable for the preparation of primer coats, intermediate coats and top coats.

The following examples serve to illustrate the invention in greater detail. All parts and percentages are by weight unless otherwise indicated.

EXAMPLES

General Preparation Procedure for the Polyester Polyols

The polyols and the unsaturated dicarboxylic acids/anhydrides were weighed out into a reactor equipped with a stirrer, a heater, an automatic temperature control, a column and a receiver, and heated to 100° to 150° C. A stream of nitrogen was passed through the inhomogeneous mixture of raw materials. After the addition of the remaining dicarboxylic acids, the mixture of raw materials was heated to 200° C. over 4 to 8 hours with stirring and with the passage of nitrogen. The temperature measured at the top of the column was kept at a maximum of 105° C. The melt became homogeneous and clear during this process. As soon as the top temperature fell below 90° C., the column was removed and the product was condensed out with an increased stream of nitrogen to an acid number of <3 mg KOH/g.

Colorless resins were obtained which were dissolved in methoxypropyl acetate, butyl acetate and mixtures thereof.

The composition and the properties for the individual polyesters prepared in this way are set forth in Examples I to 11. As can be seen from the weights in "g", the amounts given in "moles" relate not to the actual number of "moles" but to the molar ratio between the various components. The units for the hydroxyl and acid numbers are given in "mg KOH/g."

EXAMPLE 1

(According to the Invention)

| Polyester of | Weight |
| --- | --- |
| 1.0 mole of hexanediol | 555 g |
| 1.0 mole of trimethylolpropane | 630 g |
| 1.5 moles of 1,4-bis-(hydroxymethyl)-cyclohexane | 1016 g |
| 1.5 moles of neopentyl glycol | 736 g |
| 0.4 moles of adipic acid | 275 g |
| 3.6 moles of maleic anhydride | 1661 g |

Hydroxyl number: 163
Acid number: 2.5

EXAMPLE 2

(According to the Invention)

| Polyester of | Weight |
| --- | --- |
| 1.0 mole of hexanediol | 554 g |
| 1.0 mole of trimethylolpropane | 628 g |
| 1.5 moles of 1,4-bis-(hydroxymethyl)-cyclohexane | 1013 g |
| 1.5 moles of neopentyl glycol | 733 g |
| 0.5 moles of adipic acid | 343 g |
| 3.5 moles of maleic anhydride | 1610 g |

Hydroxyl number: 159
Acid number: 2.3

EXAMPLE 3

(According to the Invention)

| Polyester of | Weight |
| --- | --- |
| 1.5 moles of hexanediol | 833 g |
| 1.0 moles of trimethylolpropane | 630 g |
| 1.25 moles of 1,4-bis-(hydroxymethyl)-cyclohexane | 846 g |
| 1.25 moles of neopentyl glycol | 613 g |
| 0.5 moles of adipic acid | 344 g |
| 3.5 moles of maleic anhydride | 1615 g |

Hydroxyl number: 158
Acid number: 1.5

EXAMPLE 4

(According to the Invention)

| Polyester of | Weight |
| --- | --- |
| 2.0 moles of hexanediol | 1114 g |
| 1.0 mole of trimethylolpropane | 632 g |
| 1.0 mole of 1,4-bis-(hydroxymethyl)-cyclohexane | 679 g |
| 1.0 mole of neopentyl glycol | 492 g |
| 0.5 moles of adipic acid | 345 g |
| 3.5 moles of maleic anhydride | 1620 g |

Hydroxyl number: 162
Acid number: 1.9

EXAMPLE 5

(According to the Invention)

| Polyester of | Weight |
|---|---|
| 1.0 mole of hexanediol | 548 g |
| 1.0 mole of trimethylolpropane | 622 g |
| 1.5 moles of 1,4-bis-(hydroxymethyl)-cyclohexane | 1003 g |
| 1.5 moles of neopentyl glycol | 726 g |
| 0.8 moles of adipic acid | 543 g |
| 3.2 moles of maleic anhydride | 1458 g |

Hydroxyl number: 157
Acid number: 2.5

EXAMPLE 6

(According to the Invention)

| Polyester of | Weight |
|---|---|
| 1.0 mole of hexanediol | 542 g |
| 1.0 mole of trimethylolpropane | 614 g |
| 1.5 moles of 1,4-bis-(hydroxymethyl)-cyclohexane | 991 g |
| 1.5 moles of neopentyl glycol | 718 g |
| 1.2 moles of adipic acid | 804 g |
| 2.8 moles of maleic anhydride | 1260 g |

Hydroxyl number: 157
Acid number: 2.1

EXAMPLE 7

(According to the Invention)

| Polyester of | Weight |
|---|---|
| 1.0 mole of hexanediol | 535 g |
| 1.0 mole of trimethylolpropane | 607 g |
| 1.5 moles of 1,4-bis-(hydroxymethyl)-cyclohexane | 979 g |
| 1.5 moles of neopentyl glycol | 709 g |
| 1.6 moles of adipic acid | 1060 g |
| 2.4 moles of maleic anhydride | 1067 g |

Hydroxyl number: 159
Acid number: 2.4

EXAMPLE 8

(According to the Invention)

| Polyester of | Weight |
|---|---|
| 1.0 mole of hexanediol | 532 g |
| 1.0 mole of trimethylolpropane | 603 g |
| 1.5 moles of 1,4-bis(hydroxymethyl)-cyclohexane | 973 g |
| 1.5 moles of neopentyl glycol | 705 g |
| 1.8 moles of adipic acid | 1185 g |
| 2.2 moles of maleic anhydride | 972 g |

Hydroxyl number: 152
Acid number: 0.6

EXAMPLE 9

(According to the Invention)

| Polyester of | Weight |
|---|---|
| 1.0 mole of hexanediol | 529 g |
| 1.0 mole of trimethylolpropane | 600 g |
| 1.5 moles of 1,4-bis-(hydroxymethyl)-cyclohexane | 967 g |
| 1.5 moles of neopentyl glycol | 700 g |
| 1.9 moles of adipic acid | 1309 g |
| 2.1 moles of maleic anhydride | 879 g |

Hydroxyl number: 154
Acid number: 2.7

EXAMPLE 10

(Comparative)

| Polyester of | Weight |
|---|---|
| 1.0 mole of hexanediol | 529 g |
| 1.0 mole of trimethylolpropane | 600 g |
| 1.5 moles of 1,4-bis-(hydroxymethyl)-cyclohexane | 967 g |
| 1.5 moles of neopentyl glycol | 700 g |
| 2.2 moles of adipic acid | 1440 g |
| 1.8 moles of maleic anhydride | 791 g |

Hydroxyl number: 146
Acid number: 0.8

EXAMPLE 11

(Comparative)

| Polyester of | Weight |
|---|---|
| 1.0 mole of hexanediol | 522 g |
| 1.0 mole of trimethylolpropane | 593 g |
| 1.5 moles of 1,4-bis-(hydroxymethyl)cyclohexane | 956 g |
| 1.5 moles of neopentyl glycol | 692 g |
| 2.4 moles of adipic acid | 1552 g |
| 1.6 moles of maleic anhydride | 695 g |

Hydroxyl number: 150
Acid number: 1.4

EXAMPLE 12

(Use)

This example describes the preparation of two-component coating compositions based on the polyester polyols prepared in Examples 1 to 11, their application and the testing of the resulting coatings.

White coating compositions were prepared in order to assess the general coatings properties. The polyester polyols of Examples 1 to 11 were admixed with various additives and white pigments and ground on a shaking block ("Red Devil"). A lacquer polyisocyanate was then added at an NCO/OH equivalent ratio of approx. 1.3:1. The "lacquer polyisocyanate" was a polyisocyanate which was prepared from 1,6-diisocyanatohexane and contained isocyanurate groups (Desmodur N 3390, available from Bayer AG, 90% solution in a 1:1 blend of butyl acetate/solvent naphtha 100, NCO content of the solution: 19.4% by weight).

Based on solid resin (sum of the polyol and polyisocyanate solids), the following proportions of additives were used:

TABLE 1

| Constituents | % by weight based on solids |
|---|---|
| Zinc octoate (10% in 1-methoxyprop-2-yl acetate) | 0.2 |
| Silicone oil as levelling agent (Baysilon OL 17 additive from Bayer AG; 10% in 1-methoxyprop-2-yl acetate) | 0.1 |
| Tinuvin 292 (light stabilizer from Ciba-Geigy, Basle; 10% in xylene) | 1.0 |
| Tinuvin 900 (light stabilizer from Ciba-Geigy, Basle; 10% in xylene) | 1.0 |
| Titanium dioxide (rutile type; Kronos 2160 from Kronos-Titan, Leverkusen) | 60.0 |
| Antisettling agent (Bentone 38 from Kronos-Titan, Leverkusen; 10% suspension in 17:1 Solvesso solvent, Antiterra U additive blend) | 1.0 |

The coating composition solvent was a 1:1:1 blend of ethyl acetate, 1-methoxyprop-2-yl acetate and methyl ethyl ketone. The resulting coating composition contained:

33% by weight of binder
20% by weight of pigment
approx. 1% by weight of additives
approx. 46% by weight of solvent compositions prepared from the polyester polyols of Examples 1 to 11 possessed excellent elasticity, even at low temperatures.

Table II sets forth the test results for the coatings prepared from coating compositions containing the polyester polyols of Examples 1 to 11.

TABLE II

Test results for coatings prepared from compositions containing the polyesters of Examples 1 to 11.

| Coating based on the polyester of Example | | 1 | 2 | 3 | 4 | 5 | 6 |
|---|---|---|---|---|---|---|---|
| Konig pendulum hardness (s) | | 153 | 161 | 129 | 95 | 140 | 116 |
| Gardner floss, 60° C. | | 87 | 88 | 90 | 92 | 86 | 88 |
| Susceptibility to etching[1], | by xylene | 0 | 0 | 0 | 0 | 0 | 0 |
| Duration of action | acetone | 1 | 1 | 1 | 1 | 2 | 2 |
| 1 minute | ethyl acetate | 0 | 0 | 1 | 1 | 0 | 1 |
| | ethanol | 0 | 0 | 0 | 0 | 0 | 0 |
| Tar resistance[1] after duration of action of | 1h | 0 | 0 | 0 | 0 | 0 | 0 |
| | 3h | 0 | 0 | 0 | 0 | 0 | 0 |
| Solution: | 8h | 0 | 0 | 0 | 0 | 0 | 0 |
| DBL 7399[2] | 24h | 0 | 0 | 1 | 1 | 0 | 1 |
| Low-temperature flexibility, Coating cracked at | | −25° C. | −25° C. | −30° C. | −35° C. | −25° C. | −30° C. |

| Coating based on the polyester of Example | | 7 | 8 | 9 | 10 | 11 |
|---|---|---|---|---|---|---|
| Konig pendulum hardness (s) | | 101 | 91 | 87 | 69 | 53 |
| Gardner floss, 60° C. | | 85 | 89 | 87 | 88 | 86 |
| Susceptibility to etching[1], | by xylene | 0 | 0 | 0 | 1 | 1 |
| Duration of action | acetone | 2 | 2 | 2 | 3 | 3 |
| 1 minute | ethyl acetate | 2 | 2 | 2 | 3 | 3 |
| | ethanol | 0 | 1 | 1 | 1 | 2 |
| Tar resistance[1] after duration of action of | 1h | 0 | 0 | 0 | 1 | 1 |
| | 3h | 0 | 0 | 0 | 1 | 2 |
| Solution: | 8h | 0 | 0 | 1 | 2 | 2 |
| DBL 7399[2] | 24h | 1 | 1 | 1 | 2 | 3 |
| Low-temperature flexibility, Coating cracked at | | −35° C. | −35° C. | −40° C. | −40° C. | −40° C. |

[1] Best value 0, worst value 5
[2] Special tar solution from Daimler Benz AG for determing the tar resistance of car coatings
Composition
  30.5% by weight of Carbomasse EP KS (Ruttgerswerke AG)
  62.0% by weight of Edenol D81 (Henkel)
  2.7% by weight of Santicizier 160 (Monsanto)
  4.8% by weight of Palatinon 0 (BASF AG)

The discharge time (DIN 53211; 4 mm nozzle) was approx. 18 seconds. The lacquers were thus made ready for spraying. The pot life on storage in a sealed drum was approx. 60 to 80 hours.

The lacquers were sprayed onto glass plates (wet film thickness approx. 100 μm), dried for 45 minutes at 80° C. and stored for 14 days at room temperature. The dry film thickness was approx. 50 μm.

The König hardness (DIN 53157), the Gardner gloss at 60° C. (DIN 67530), the susceptibility to etching by various solvents and the tar resistance were then tested. The resistance of the coatings to tar stains is a very important property.

Furthermore, for testing the low temperature flexibility, the coating compositions were sprayed onto previously primed, 3 mm thick plastic boards made from Bayflex 91 Elastomer (Bayer AG, Leverkusen), dried for 45 minutes at 80° C. and stored for 14 days at room temperature; the dry film thickness was approx. 35 μm.

2 cm wide and 15 cm long strips prepared from these boards were stored in a cold chamber at various temperatures (room temperature, 5° C., 0° C., −5° C., . . . , −40° C.) for approx. 30 minutes and then bent around a 1 inch mandrel in the chamber at the respective temperature. The temperature at which the coating cracked was used to determine the low-temperature flexibility. Based on this test, it is readily apparent that the coating

DISCUSSION OF THE RESULTS

The coating compositions containing the polyesters of Examples 1 to 11 make it possible to obtain highly flexible coatings without exception, the lacquers of Examples 9 to 11 achieving the best elasticity values. The results of the tar resistance test clearly demonstrate in particular the excellent tar resistance of the coatings according to the invention of Examples 1 to 9, in contrast to the coatings of Comparative Examples 10 and 11. The improvement of the coatings according to the invention is also apparent from the solvent resistance test. A further advantage of the coatings according to the invention is in the substantially higher pendulum hardness for these coatings when compared to the comparison coatings.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyester polyol which has a hydroxyl number of 80 to 250 and comprises the reaction product of a) 52 to 60 mole % of a polyol component consisting essentially of
   i) 10 to 50 mole % of one or more dihydric aliphatic alcohols having at least two carbon atoms, other than neopentyl glycol,
   ii) 5 to 40 mole % of one or more trihydric or higher functional aliphatic alcohols having at least 3 carbon atoms,
   iii) 10 to 40 mole % of one or more cycloaliphatic diols and
   iv) 10 to 60 mole % of neopentyl glycol, with
b) 40 to 48 mole % of a dicarboxylic acid component consisting essentially of
   v) 0 to 49.9 mole % of one or more saturated aliphatic dicarboxylic acids or an anhydrides thereof having at least 2 carbon atoms and
   vi) 50.1 to 100 mole % of one or more unsaturated aliphatic dicarboxylic acids or anhydrides thereof having at least 4 carbon atoms
wherein the percentages of a) and b), i) to iv) and v to vi) add up to 100.

2. The polyester polyol of claim 1 wherein
component i) comprises hexane-1,6-diol;
component ii) comprises trimethylolpropane, glycerol or pentaerythritol,
component iii) comprises 1,4-bis-(hydroxymethyl)cyclohexane,
component v) comprises adipic acid and
component vi) comprises maleic anhydride.

3. The polyester polyol of claim 1 wherein component b) contains 5 to 40 mole % of component v) and 60 to 95 mole % of component vi).

4. The polyester polyol of claim 2 wherein component b) contains 5 to 40 mole % of component v) and 60 to 95 mole % of component vi).

5. A two-component coating composition wherein the binder comprises
I) one or more polyisocyanates and
II) a polyester polyol which has a hydroxyl number of 80 to 250 and comprises the reaction product of
   a) 52 to 60 mole % of a polyol component consisting essentially of
      i) 10 to 50 mole % of one or more dihydric aliphatic alcohols having at least two carbon atoms, other than neopentyl glycol,
      ii) 5 to 40 mole % of one or more trihydric or higher functional aliphatic alcohols having at least 3 carbon atoms,
      iii) 10 to 40 mole % of one or more cycloaliphatic diols and
      iv) 10 to 60 mole % of neopentyl glycol, with
   b) 40 to 48 mole % of a dicarboxylic acid component consisting essentially of
      v) 0 to 49.9 mole % of one or more saturated aliphatic dicarboxylic acids or an anhydrides thereof having at least 2 carbon atoms and
      vi) 50.1 to 100 mole % of one or more unsaturated aliphatic dicarboxylic acids or anhydrides thereof having at least 4 carbon atoms,
wherein the percentages of a) and b), i) to iv) and v to vi) add up to 100.

6. The two-component coating composition of claim 5 wherein
component i) comprises hexane-1,6-diol;
component ii) comprises trimethylolpropane, glycerol or pentaerythritol,
component iii) comprises 1,4-bis-(hydroxymethyl)cyclohexane,
component v) comprises adipic acid and
component vi) comprises maleic anhydride.

7. The two-component coating composition of claim 5 wherein component b) contains 5 to 40 mole % of component v) and 60 to 95 mole % of component vi).

8. The two-component coating composition of claim 6 wherein component b) contains 5 to 40 mole % of component v) and 60 to 95 mole % of component vi).

9. A coated plastic substrate which has been coated with a two-component coating composition wherein the binder
I) one or more polyisocyanates and
II) a polyester polyol which has a hydroxyl number of 80 to 250 and comprises the reaction product of
   a) 52 to 60 mole % of a polyol component consisting essentially of
      i) 10 to 50 mole % of one or more dihydric aliphatic alcohols having at least two carbon atoms, other than neopentyl glycol,
      ii) 5 to 40 mole % of one or more trihydric or higher functional aliphatic alcohols having at least 3 carbon atoms,
      iii) 10 to 40 mole % of one or more cycloaliphatic diols and
      iv) 10 to 60 mole % of neopentyl glycol, with
   b) 40 to 48 mole % of a dicarboxylic acid component consisting essentially of
      v) 0 to 49.9 mole % of one or more saturated aliphatic dicarboxylic acids or an anhydrides thereof having at least 2 carbon atoms and
      vi) 50.1 to 100 mole % of one or more unsaturated aliphatic dicarboxylic acids or anhydrides thereof having at least 4 carbon atoms,
wherein the percentages of a) and b), i) to iv) and v to vi) add up to 100.

10. The coated plastic substrate of claim 9 wherein the plastic substrate is a flexible plastic part used in car construction.

11. The coated plastic substrate of claim 9 wherein the plastic substrate is a metal/plastic part used in car construction.

* * * * *